US010266080B2

(12) United States Patent
Stebbins et al.

(10) Patent No.: US 10,266,080 B2
(45) Date of Patent: Apr. 23, 2019

(54) SEAT TRACK SUPPORT DAMPER

(71) Applicant: GM GLOBAL TECHNOLOGY OPERATIONS LLC, Detroit, MI (US)

(72) Inventors: Mark A. Stebbins, Bloomfield Hills, MI (US); John J. Mascarello, Livonia, MI (US); Sharath Varadappa, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 292 days.

(21) Appl. No.: 15/188,422

(22) Filed: Jun. 21, 2016

(65) Prior Publication Data

US 2017/0361740 A1 Dec. 21, 2017

(51) Int. Cl.
*B60N 2/50* (2006.01)
*B60N 2/52* (2006.01)
*B60N 2/06* (2006.01)
*B60N 2/07* (2006.01)
*B60N 2/42* (2006.01)

(52) U.S. Cl.
CPC .............. *B60N 2/509* (2013.01); *B60N 2/06* (2013.01); *B60N 2/0722* (2013.01); *B60N 2/4242* (2013.01); *B60N 2/502* (2013.01); *B60N 2/522* (2013.01)

(58) Field of Classification Search
CPC ...... B60N 2/522; B60N 2/509; B60N 2/4242; B60N 2/0722; B60N 2/06; B60N 2/502

USPC .............. 297/216.18, 344.11, 344.1, 216.17; 296/68.1, 65.13

See application file for complete search history.

(56) References Cited

U.S. PATENT DOCUMENTS

| 5,876,085 A * | 3/1999 | Hill ........................ B60N 2/502 296/65.02 |
| 6,224,131 B1 * | 5/2001 | Shammout ........... B60N 2/4221 296/68.1 |
| 2014/0196998 A1 * | 7/2014 | Nauman ................. C08L 83/04 188/377 |

* cited by examiner

*Primary Examiner* — Milton Nelson, Jr.
(74) *Attorney, Agent, or Firm* — Quinn IP Law

(57) ABSTRACT

A vehicle seat is disposed on a floor portion of a passenger compartment, and includes first and second upper seat tracks, and a seat bottom disposed thereon. First and second lower seat tracks are each disposed longitudinally in the vehicle and secured to the floor portion at respective fore and aft attachment locations, wherein each of the first and second upper seat tracks is slidably disposed in a respective one of the first and second lower seat tracks. A support damper is disposed between the floor portion and one of the first and second lower seat tracks and disposed between the respective fore and aft attachment locations. The support damper is disposed at a longitudinal position between the respective fore and aft attachment locations at a maximum vertical deflection point of the respective one of the first and second lower seat tracks relative to the floor portion.

10 Claims, 3 Drawing Sheets

SEAT TRACK SUPPORT DAMPER

TECHNICAL FIELD

The present disclosure relates to passenger seat assemblies for vehicles.

BACKGROUND

Vehicles may include seat assemblies that can be configured to support passengers within the vehicle. A seat assembly may include a seat bottom and a seat back, which can be supported on the seat bottom. In turn, the seat bottom may be secured to or otherwise supported on a vehicle floor portion that is located within a passenger compartment of the vehicle. For example, the seat assembly may be supported on a pair of seat track assemblies for movement in fore and aft directions (i.e., forward and backward).

A seat track assembly may include a lower seat track and an upper seat track. The lower seat track can be mounted to or otherwise attached to the floor of the vehicle. The upper seat track can be supported for sliding movement on the lower seat track, with the seat assembly mounted to or otherwise supported on the upper seat track. Alternatively, the seat track assembly may provide for the seat assembly being in a fixed location. Moreover, the seat track assembly may also include a seat track locking mechanism provided between the lower and upper seat tracks to selectively lock or otherwise prevent sliding movement of the upper seat track relative to the lower seat track.

Vehicle floors may propagate vibration to a vehicle seat via a seat track, wherein such vibration may originate from powertrain components, driveline components, suspension components, torsional movement of the vehicle floor portion, etc. Such vibration may be visually, audibly and/or haptically discernible to vehicle passengers. Furthermore, a vehicle seat may amplify such vibration due to resonance and other factors.

SUMMARY

A vehicle seat is disposed on a floor portion of a passenger compartment, and includes first and second upper seat tracks, and a seat bottom disposed thereon. First and second lower seat tracks are each disposed longitudinally in the vehicle and secured to the floor portion at respective fore and aft attachment locations, wherein each of the first and second upper seat tracks is slidably disposed in a respective one of the first and second lower seat tracks. A support damper is disposed between the floor portion and one of the first and second lower seat tracks and disposed between the respective fore and aft attachment locations corresponding to the one of the first and second lower seat tracks. The support damper is disposed at a longitudinal position between the respective fore and aft attachment locations at a maximum vertical deflection point of the respective one of the first and second lower seat tracks relative to the floor portion.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3-1 schematically illustrates a mechanical linkage diagram of a side-view of a seat assembly that is disposed on a vehicle floor portion and attached thereto, in accordance with the disclosure;

FIG. 3-2 schematically illustrates a mechanical linkage diagram depicting a rear-view of the seat assembly including seat back that is disposed on the vehicle floor portion and attached thereto, and corresponding in relevant portions to the mechanical linkage diagram shown in FIG. 3-1, in accordance with the disclosure.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, front, fore and aft may be used with respect to the drawings. These and similar directional terms are not to be construed to limit the scope of the disclosure in any manner.

Figure 1:
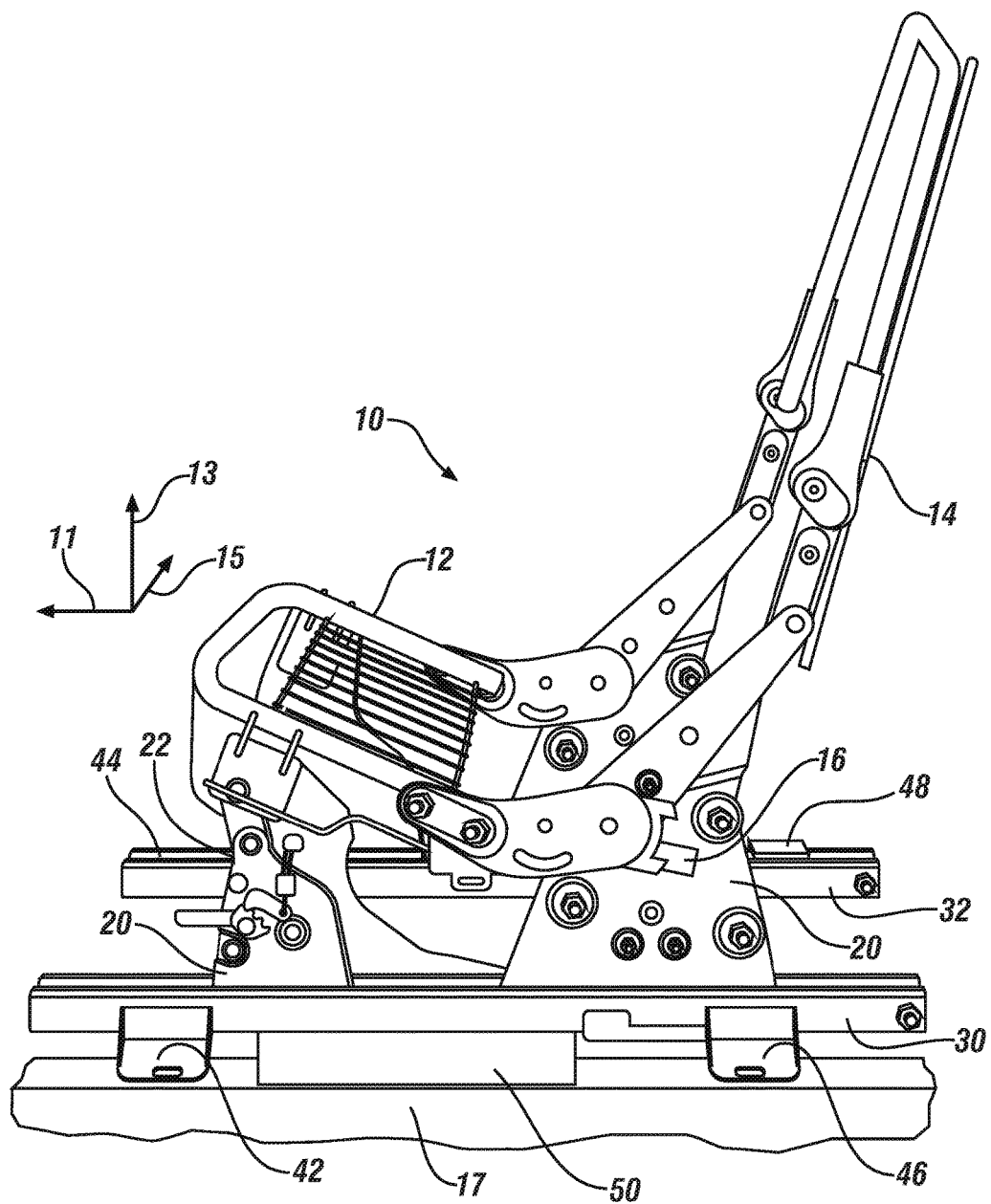
FIG. 1 schematically illustrates a perspective view of a seat assembly that may be disposed in a passenger compartment of a vehicle, in accordance with the disclosure.

Referring to the drawings, wherein like reference numerals correspond to like or similar components throughout the several Figures, FIG. 1, consistent with embodiments disclosed herein, illustrates a seat assembly 10 that may be disposed in a passenger compartment of a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like, in accordance with this disclosure. Directions and locations on the vehicle and the seat assembly 10 may be described in context of a longitudinal axis 11, a vertical axis 13, and a lateral axis 15, wherein the longitudinal axis 11 is oriented in a longitudinal direction relative to the vehicle, the vertical axis 13 is oriented in a vertical direction relative to the vehicle, and the lateral axis 15 is oriented in a lateral direction relative to the vehicle.

The seat assembly 10 preferably includes a bottom portion 12 and a back portion 14 that may be rigidly attached at a junction 16. The seat assembly 10 may include suitable operator-controllable mechanisms to facilitate rotation of the back portion 14 relative to the bottom portion 12 at the junction 16. The seat assembly 10 is preferably disposed on a vehicle floor portion 17 and attached thereto. The bottom portion 12 may be disposed on first and second longitudinally-oriented upper seat tracks 20, 22, respectively, which preferably are disposed on opposite lateral sides thereof. The first and second upper seat tracks 20, 22, are preferably slidably disposed on respective first and second lower seat tracks 30, 32, which are longitudinally disposed in the vehicle and secured to the vehicle floor portion 17 at respective fore attachment locations 42, 44 and aft attachment locations 46, 48. The first and second upper seat tracks 20, 22 are slidably disposed in the respective one of the first and second lower seat tracks 30, 32. This arrangement of the seat assembly 10 and the seat tracks 20, 22, 30, 32 is for purposes of illustration only; other suitable arrangements may be employed within the scope of the disclosure. By way of example, the seat assembly 10 may be disposed in a fixed location with regard to the fore attachment locations 42, 44 and aft attachment locations 46, 48. Alternatively, the seat assembly 10 may be disposed on one or more seat tracks that extend laterally, with corresponding left and right attachment locations (not shown) that secure the seat assembly 10 to the vehicle floor portion 17.

A first support damper 50 is disposed between the vehicle floor portion 17 and the first lower seat track 30 and between the corresponding fore and aft attachment locations 42, 46, respectively. Likewise, in one embodiment, a second support damper (not shown) may be disposed between the vehicle floor portion 17 and the second lower seat track 32 and between the corresponding fore and aft attachment locations 44, 48, respectively. Alternatively, the second support damper may be omitted, i.e., only the first support damper 50 may be employed.

The support damper 50 may be advantageously disposed to dampen vertical vibration of one of the lower seat tracks 30, 32. Each support damper 50 may be described in terms of a mechanical stiffness, i.e., a resistance to deformation in response to an applied force, wherein the applied force may be static, intermittent, and/or periodic. The mechanical stiffness may be characterized in terms of the modulus of elasticity. Furthermore, each support damper 50 may be characterized as an overdamped device, an underdamped device or a critically damped device, wherein such characterization may be defined in context of a primary excitation frequency of the applied force that is acting upon the lower seat track in one embodiment.

The support damper 50 is any suitable vibration damping device that is configured to dampen vibration that is induced in the vehicle floor portion 17 and transferred to the seat assembly 10 via the first and/or second upper seat tracks 20, 22. The support damper 50 may be an elongated device fabricated from elastomeric material in one embodiment. In one embodiment, the elastomeric material may have a modulus of elasticity of 100 MPa, a density of 4E-10 ton/mm$^3$, and a critical damping parameter of 10%, i.e., 'soft' rubber. Alternatively, the support damper 50 may be a viscous fluidic damper, an embodiment of which is described with reference to FIG. 4. Alternatively, the support damper 50 may be fabricated from another suitable material that dampens periodic or aperiodic forces that are propagated into the seat assembly 10.

Figure 2:
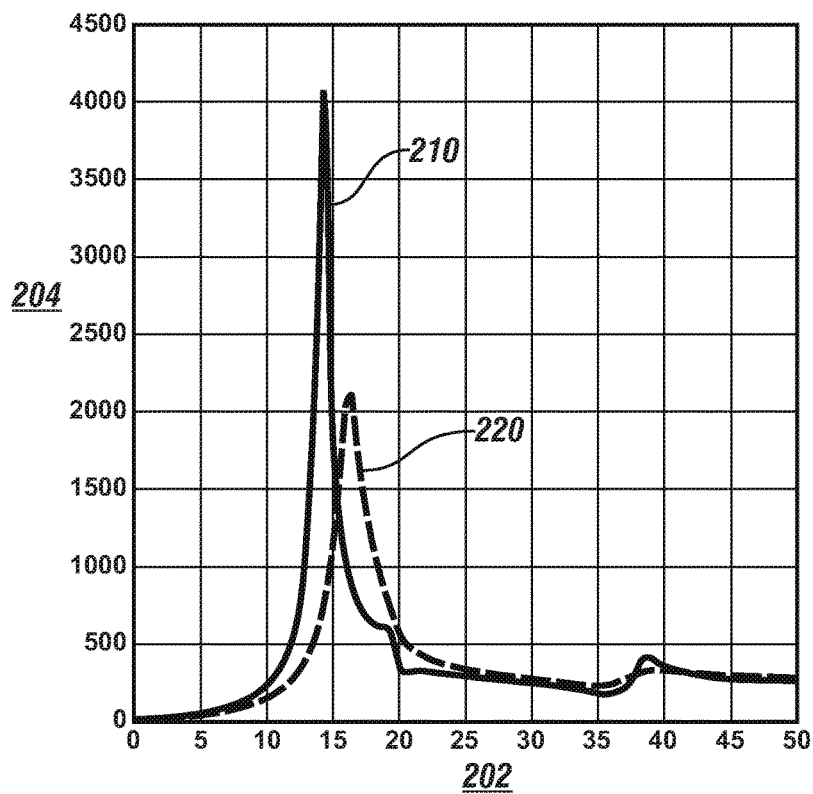
FIG. 2 graphically shows an example of vibrational force that is induced in a vehicle floor portion and transferred to a seat assembly under a set of vehicle operating conditions, wherein frequency (Hz) is indicated on the horizontal axis and amplitude is indicated on the vertical axis, in accordance with the disclosure.

FIG. 2 graphically shows an example of vibrational force that is induced in the vehicle floor portion 17 and transferred to the seat assembly 10 under one set of vehicle operating conditions, wherein frequency (Hz) is indicated on the horizontal axis 202 and amplitude (mm/sec$^2$/N) is indicated on the vertical axis 204. Line 210 indicates vibrational acceleration on the seat assembly 10 that may occur without benefit of the support damper 50, which has an amplitude of 4100 mm/sec$^2$/N at a frequency of 14.2 Hz. Line 220 indicates vibrational acceleration on the seat assembly 10 that may occur with the support damper 50 in place under the same operating conditions, which has an amplitude of 2100 mm/sec$^2$/N at a frequency of 16.1 Hz. These results indicate that introducing the support damper 50 may serve to reduce magnitude of the vibration that is transferred to the seat assembly 10 under vehicle operating conditions.

Figures 1, 3:
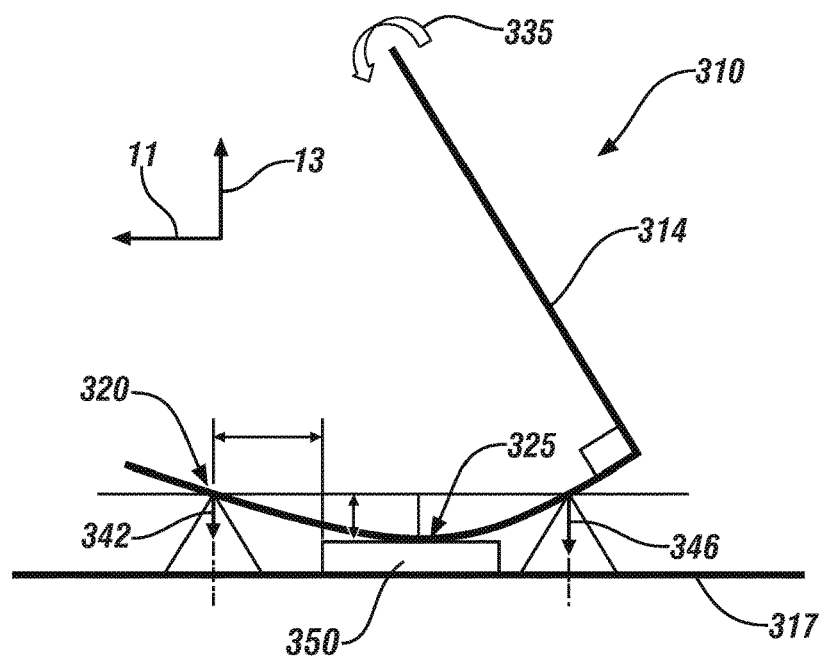
Figures 2, 3:
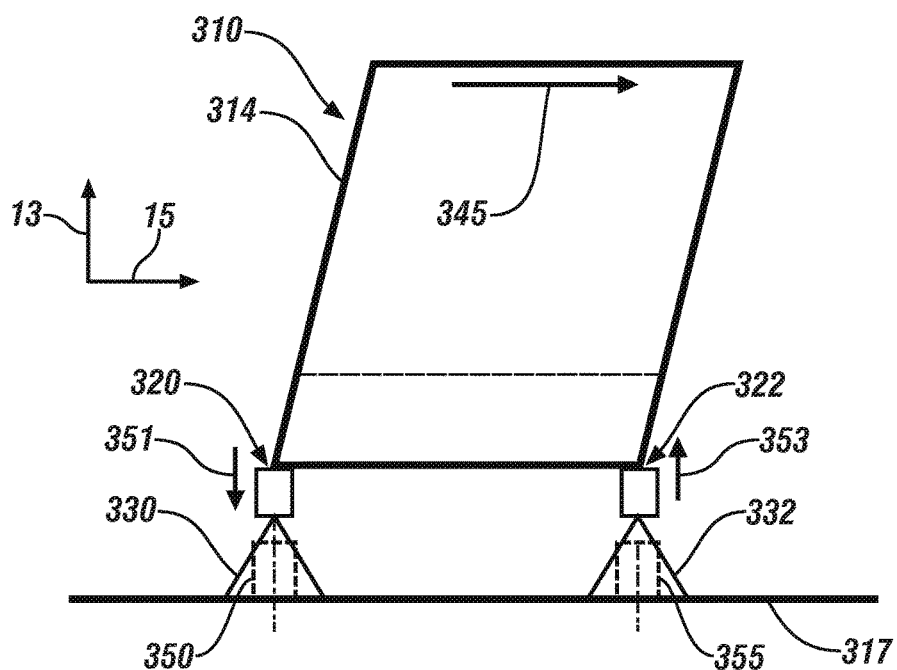

FIG. 3-1 schematically shows a mechanical linkage diagram depicting a side-view of a seat assembly 310 that is disposed on a vehicle floor portion 317 and attached thereto. The seat assembly 310 is shown in context of the longitudinal axis 11 and vertical axis 13 that are described with reference to FIG. 1. The seat bottom and upper and lower seat tracks are indicated by element 320. A first support damper 350 is disposed between the vehicle floor portion 317 and the seat bottom and upper and lower seat tracks 320 and between the corresponding fore and aft attachment locations 342, 346, respectively. Preferably, the first support damper 350 is advantageously disposed along the longitudinal axis 11 such that it physically contacts the seat bottom and upper and lower seat tracks 320 at a maximum vertical deflection point, which is indicated by element 325. As is appreciated, the maximum vertical deflection point 325 is application-specific, and may be determined based upon details related to the design and implementation of the seat bottom and upper and lower seat tracks 320. The vertical deflection of the seat bottom and upper and lower seat tracks 320 also causes a corresponding rotation of the seat back 314 in a longitudinal direction due to their rigid attachment, as indicated by rotational arrow 335.

FIG. 3-2 schematically shows a mechanical linkage diagram depicting a rear-view of the seat assembly 310 including seat back 314 that is disposed on the vehicle floor portion 317 and attached thereto, and corresponds in relevant portions to the mechanical linkage diagram shown in FIG. 3-1. The seat assembly 310 is shown in context of the lateral axis 15 and the vertical axis 13 that are described with reference to FIG. 1. First and second seat bottom and upper and lower seat tracks are indicated by elements 320 and 322, respectively. First and second support dampers 350 and 355, respectively, are disposed between the vehicle floor portion 317 and the first seat bottom and upper and lower seat tracks 320 and between the corresponding first and second (e.g., left and right) attachment locations 330, 332, respectively. Preferably, the first support damper 350 is advantageously disposed along the longitudinal axis 11 such that it physically contacts the first seat bottom and upper and lower seat tracks 320 at a maximum vertical deflection point. Likewise, the second support damper 355 is advantageously disposed along the longitudinal axis 11 such that it physically contacts the second seat bottom and upper and lower seat tracks 322 at a maximum vertical deflection point. As is appreciated, the maximum vertical deflection point 325 is application-specific, and may be determined based upon details related to the design and implementation of the seat bottom and upper and lower seat tracks 320. A downward vertical deflection of the first seat bottom and upper and lower seat tracks 320 (indicated by arrow 351) coupled with an upward vertical deflection of the second seat bottom and upper and lower seat tracks 322 (indicated by arrow 353) causes a reactive rotation of the seat back 314 in the lateral dimension due to their rigid attachment, as indicated by arrow 345. It is appreciated that the seat back 314 reactive rotates in the lateral dimension in the opposite direction due to the elasticity and interconnectedness of the first and second seat bottom and upper and lower seat tracks 320, 322.

Figure 4:
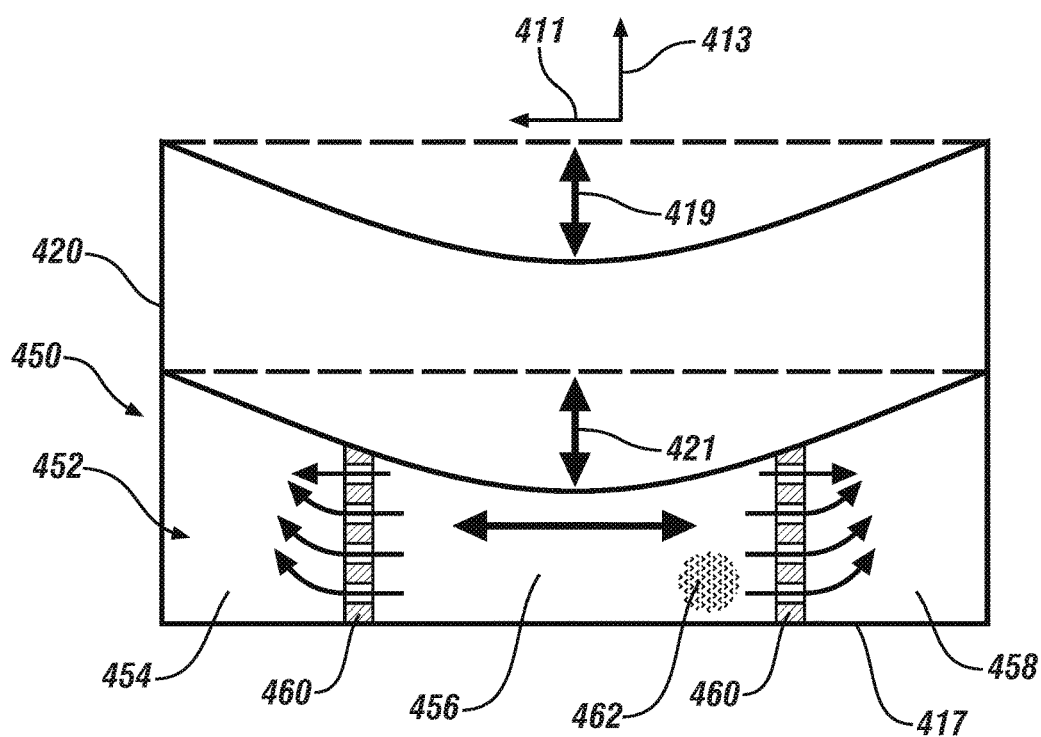
FIG. 4 schematically illustrates a cut-away side view of one embodiment of a viscous fluidic damper that may be advantageously employed between a lower seat track disposed on a vehicle seat and a vehicle floor portion, wherein the cut-away side view is indicated in a plane defined by a longitudinal axis and a vertical axis, in accordance with the disclosure.

FIG. 4 schematically shows a cut-away side view of one embodiment of a viscous fluidic damper 450, which may been advantageously employed between an associated lower seat track 420 and a vehicle floor portion 417. Associated longitudinal axis 411 and vertical axis 413 are shown. The viscous fluidic damper 450 includes a closed, sealed fluid chamber 452 that is fabricated from elastomeric material and is elongated in the longitudinal direction. The fluidic chamber 452 is divided into a first sub-chamber 454, a second sub-chamber 456 and a third sub-chamber 458, and is substantially or completely filled with a viscous fluid 462. The first, second and third sub-chambers 454, 456 and 458 are preferably arranged in series along the longitudinal axis 411 and separated by porous fluidic baffles 460. The porous fluidic baffles 460 serve as flow restrictors, i.e., they function to impede flow of the viscous fluid 462 between the first, second and third sub-chambers 454, 456 and 458 when the viscous fluidic damper 450 is subjected to deflection, as may occur in response to periodic or aperiodic forces acting upon the lower seat track 420 and a vehicle floor portion 417.

The lower seat track 420 is depicted with a vertical deflection 419, which induces a vertical deflection 421 in the viscous fluidic damper 450. The vertical deflection 419 may be vibration-induced via the corresponding fore and aft attachment locations. When the vertical deflection 419 in the lower seat track 420 induces the vertical deflection 421 in the viscous fluidic damper 450, force is exerted on the viscous fluid 462 to flow away from the vertical deflection 421, with such fluidic flow resisted by the porous fluidic baffles 460, as indicated by the arrows that are extending through the openings therein. This resistance to the fluidic flow of the viscous fluid 462 results in a correspondent reduction in deflection and vibration of the lower seat track 420.

Inclusion of an embodiment of the support damper described herein may advantageously result in reduced visible, audible and/or haptic vibration of a seat assembly that is unoccupied, wherein the vibration may originate from powertrain components, driveline components, suspension components, and/or torsional movement of the vehicle floor. Inclusion of an embodiment of the support damper described herein may further advantageously result in reduced visible, audible and/or haptic vibration of the seat assembly when occupied.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A seat disposed on a floor portion of a passenger compartment of a vehicle, comprising:
first and second upper seat tracks;
a seat bottom disposed on the first and second upper seat tracks;
first and second lower seat tracks, each disposed longitudinally in the vehicle and secured to the floor portion at respective fore and aft attachment locations, wherein each of the first and second upper seat tracks is slidably disposed in a respective one of the first and second lower seat tracks;
a support damper disposed between the floor portion and one of the first and second lower seat tracks and disposed between the respective fore and aft attachment locations corresponding to the one of the first and second lower seat tracks, wherein the support damper is disposed at a longitudinal position between the respective fore and aft attachment locations at a maximum vertical deflection point of the respective one of the first and second lower seat tracks relative to the floor portion.

2. The vehicle seat of claim 1, wherein the support damper is fabricated from an elastomeric material.

3. The vehicle seat of claim 2, wherein the elastomeric material has a modulus of elasticity in the order of magnitude of 100 mPa, a density of 4E-10 ton/mm$^3$, and a critical damping of 10%.

4. The vehicle seat of claim 1, wherein the support damper comprises a viscous support damper.

5. The vehicle seat of claim 1, wherein the support damper is an overdamped device.

6. The vehicle seat of claim 1, wherein the support damper is an underdamped device.

7. The vehicle seat of claim 1, wherein the support damper is a critically damped device.

8. A vehicle seat disposed on a vehicle floor portion, comprising:
first and second upper seat tracks;
a seat bottom disposed on the first and second upper seat tracks;
first and second lower seat tracks, each disposed longitudinally in the vehicle and secured to the floor portion at respective fore and aft attachment locations, wherein each of the first and second upper seat tracks is slidably disposed in a respective one of the first and second lower seat tracks; and
first and second support dampers, each disposed between the vehicle floor portion and a respective one of the first and second lower seat tracks and each disposed between the respective fore and aft attachment locations of the respective one of the first and second lower seat tracks, wherein each of the first and second support dampers is disposed at a longitudinal position between the respective fore and aft attachment locations of the respective one of the first and second lower seat tracks at a maximum vertical deflection point of the respective one of the first and second lower seat tracks relative to the vehicle floor portion.

9. The vehicle seat of claim 8, wherein each of the first and second support dampers is fabricated from an elastomeric material.

10. The vehicle seat of claim 8, wherein each of the first and second support dampers comprises a viscous support damper.

* * * * *